United States Patent
Masood et al.

(10) Patent No.: US 8,891,561 B2
(45) Date of Patent: Nov. 18, 2014

(54) 50 GB/S ETHERNET USING SERIALIZER/DESERIALIZER LANES

(71) Applicant: Broadcom Corporation, Irvine, CA (US)

(72) Inventors: Burhan Masood, Irvine, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 94 days.

(21) Appl. No.: 13/752,756

(22) Filed: Jan. 29, 2013

(65) Prior Publication Data

US 2014/0016637 A1 Jan. 16, 2014

Related U.S. Application Data

(60) Provisional application No. 61/752,070, filed on Jan. 14, 2013, provisional application No. 61/671,966, filed on Jul. 16, 2012.

(51) Int. Cl.

| H04J 3/04 | (2006.01) |
|---|---|
| H04L 12/28 | (2006.01) |
| H04L 12/761 | (2013.01) |
| H04L 12/40 | (2006.01) |
| G06F 13/00 | (2006.01) |
| H04L 12/931 | (2013.01) |

(52) U.S. Cl.
CPC ............ *H04L 45/16* (2013.01); *H04L 12/4013* (2013.01); *G06F 13/00* (2013.01); *H04L 49/00* (2013.01); *Y02B 60/31* (2013.01)
USPC ............................ 370/535; 370/419; 370/426

(58) Field of Classification Search
USPC .......... 370/391, 396, 395.53, 395.61, 395.64, 370/395.65, 419, 426, 535, 536, 537
See application file for complete search history.

(56) References Cited

U.S. PATENT DOCUMENTS

| 8,612,629 | B1 * | 12/2013 | Lo et al. .................. 709/246 |
|---|---|---|---|
| 2010/0111081 | A1 | 5/2010 | Diam |
| 2010/0281195 | A1 * | 11/2010 | Daniel et al. .............. 710/105 |
| 2012/0189315 | A1 * | 7/2012 | Sugawara .................. 398/135 |
| 2012/0236722 | A1 * | 9/2012 | Patel et al. ................. 370/235 |
| 2014/0016637 | A1 * | 1/2014 | Masood et al. ............. 370/390 |

FOREIGN PATENT DOCUMENTS

WO 00/70827 11/2000

OTHER PUBLICATIONS

European Search Report in co-pending, related EP Application No. 13003128.9, mailed Nov. 13, 2013.
Korean Office Action issued Jul. 29, 2014 in Korean Application No. 10-2013-0074370 (no English translation), 5 pages.

* cited by examiner

*Primary Examiner* — Benjamin H Elliott, IV
(74) *Attorney, Agent, or Firm* — Oblon, Spivak, McClelland, Maier & Neustadt, L.L.P.

(57) ABSTRACT

Systems, devices, and methods of implementing 50 Gb/s Ethernet using serializer/deserializer lanes are disclosed. One such device includes circuitry operable to provide a media access control (MAC) interface. The MAC interface is associated with a port having a 50 Gb/s link rate. The device also includes circuitry operable to generate Ethernet frames from data received at the MAC interface and circuitry operable to distribute the Ethernet frames across a group of serializer/deserializer (SERDES) lanes associated with the port, the group having size N. The device also includes circuitry operable to transmit the distributed Ethernet frames on each of the SERDES lanes at a 50/N Gb/s rate.

18 Claims, 7 Drawing Sheets

| Next Page | D0<br>D16<br>D32 | D1<br>D17<br>D33 | D2<br>D18<br>D34 | D3<br>D19<br>D35 | D4<br>D20<br>D36 | D5<br>D21<br>D37 | D6<br>D22<br>D38 | D7<br>D23<br>D39 | D8<br>D24<br>D40 | D9<br>D25<br>D41 | D10<br>D26<br>D42 | D11<br>D27<br>D43 | D12<br>D28<br>D44 | D13<br>D29<br>D45 | D14<br>D30<br>D46 | D15<br>D31<br>D47 |
|---|---|---|---|---|---|---|---|---|---|---|---|---|---|---|---|---|
| MP-5<br>(D0-D15) | 1 | 0 | 1 | 0 | 0 | 0 | 0 | 0 | 0 | 0 | 0 | T | 0 | 1 | ACK | 1 |
| (D16-D31) | 0 | 0 | 0 | 0 | 0 | 0 | 0 | 0 | 0 | 0 | 0 | Reserved | | | | |
| (D32-D47) | 1 | 0 | 1 | 0 | 0 | 0 | 0 | 0 | 0 | 1 | 0 | Reserved | | | | |

| Next Page | D0<br>D16<br>D32 | D1<br>D17<br>D33 | D2<br>D18<br>D34 | D3<br>D19<br>D35 | D4<br>D20<br>D36 | D5<br>D21<br>D37 | D6<br>D22<br>D38 | D7<br>D23<br>D39 | D8<br>D24<br>D40 | D9<br>D25<br>D41 | D10<br>D26<br>D42 | D11<br>D27<br>D43 | D12<br>D28<br>D44 | D13<br>D29<br>D45 | D14<br>D30<br>D46 | D15<br>D31<br>D47 |
|---|---|---|---|---|---|---|---|---|---|---|---|---|---|---|---|---|
| UP-1<br>(D0-D15) | 1 | 1 | 0 | 0 | 0 | 0 | 0 | 0 | 0 | 1 | 1 | T | 0 | 1 | ACK | NP |
| (D16-D31) | 0 | 0 | 0 | 0 | 1 | 1 | 1 | 1 | 1 | 1 | 0 | Reserved | | | | |
| (D32-D47) | | | | | | | Reserved (set to zero) | | | | | | | | | |

# 50 GB/S ETHERNET USING SERIALIZER/DESERIALIZER LANES

CROSS-REFERENCE TO RELATED APPLICATIONS

This application claims the benefit of U.S. Provisional Application No. 61/671,966, entitled "50 Gb/s Ethernet Technology for LAN Applications," filed Jul. 16, 2012, and also claims the benefit of U.S. Provisional Application No. 61/752,070, entitled "50 Gb/s Ethernet Using Serializer/Deserializer Lanes," filed Jan. 14, 2013, each of which is incorporated herein in its entirety.

TECHNICAL FIELD

The present disclosure generally relates to communications systems, and more specifically, to Ethernet networks.

BACKGROUND

Server computer networks suitable for enterprise or cloud computing typically utilize a scalable server infrastructure to host applications. A network fabric comprised of switches is often used since it scales to larger node counts without impacting the cost per server. Today's blade servers often use one of the high speed varieties of the IEEE 802.3 standard for switching within the blade server.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 illustrates an OUI tagged formatted Next Page as used during auto-negotiation by some embodiments of the LAN On Motherboard (LOM) of FIG. 1.

FIG. 4 illustrates another OUI tagged formatted Next Page as used during auto-negotiation by some embodiments of the LAN On Motherboard (LOM) of FIG. 1.

DETAILED DESCRIPTION

Figure 1:
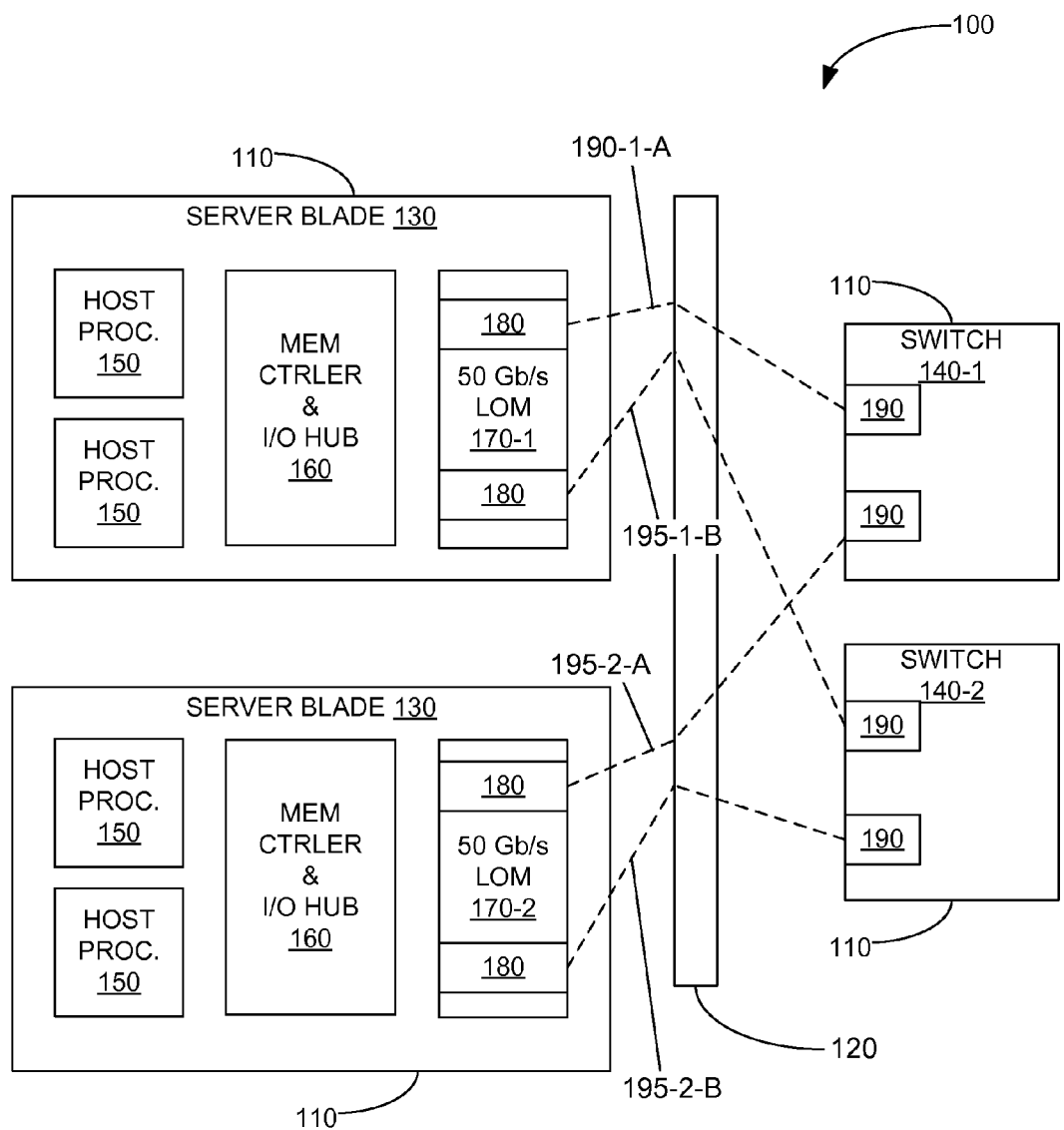
FIG. 1 is a block diagram illustrating a blade server system according to some embodiments disclosed herein.

According to the inventive techniques disclosed herein, an Ethernet controller distributes Ethernet frames across multiple serializer/deserializer (SERDES) lanes for conveyance across a blade server midplane in a manner that achieves a data rate of up to 50 Gb/s. Embodiments of the Ethernet controller can be implemented as a separate network interface controller (NIC) and physical layer transceiver (PHY), or can integrate the Media Access Control (MAC) and PHY functions onto a single chip.

One embodiment includes circuitry operable to provide a MAC interface associated with a port having a 50 Gb/s rate. This embodiment also includes circuitry operable to generate Ethernet frames from data received at the MAC interface, and to distribute the Ethernet frames over a plurality of serializer/deserializer (SERDES) lanes. The plurality has size N and each SERDES lane is operable at a 50/N Gb/s rate. This embodiment also includes circuitry operable to transmit the distributed Ethernet frames over the N SERDES lanes.

Another embodiment involves a network interface controller (NIC). The NIC includes host interface logic and physical layer (PHY) logic. The host interface logic is operable provide a MAC interface associated with a port having a 50 Gb/s rate and to generate Ethernet frames from data received at the MAC interface. The PHY logic is operable to distribute the Ethernet frames over a plurality of serializer/deserializer (SERDES) lanes. The plurality has size N and each SERDES lane is operable at a 50/N Gb/s rate. This embodiment also includes circuitry operable to transmit the distributed Ethernet frames over the N SERDES lanes.

Yet another embodiment involves a dual port NIC. The dual port NIC is operable to provide a pair of 50 Gb/s Media Access Control (MAC) ports. The dual port NIC is further operable to receive first Ethernet frames at the first 50 Gb/s MAC Port and to and transmit the first Ethernet frames over a first plurality of serializer/deserializer (SERDES) lanes associated with the first 50 Gb/s MAC Port. The first plurality has size N and each of the first SERDES lanes is operable to transmit at a 50/N Gb/s rate. The dual port NIC is further operable to receive second Ethernet frames over a second plurality of serializer/deserializer (SERDES) lanes associated with the second 50 Gb/s MAC port. The second plurality has size N and each of the second SERDES lanes is operable to transmit at a 50/N Gb/s rate. The dual port NIC is further operable to transmit the second received Ethernet frames over the second 50 Gb/s MAC port.

Still another embodiment involves device including a plurality of serializer/deserializers (SERDESes) and a network interface controller (NIC). Each SERDES implements a corresponding SERDES lane. The plurality of SERDESes has size N. Each SERDES lane is operable to transmit at a 50/N Gb/s rate. The NIC includes host interface logic and physical layer (PHY) logic. The host interface logic is operable to provide a 50 Gb/s Media Access Control (MAC) port and to receive Ethernet frames at 50 Gb/s at the MAC port. The physical interface logic is operable to transmit the Ethernet frames over the SERDES lanes.

Yet another embodiment involves a network interface controller (NIC). The NIC is operable to receive Ethernet frames from a media access control (MAC) layer at a 50 Gb/s rate, and transmit the Ethernet frames over one or more serializer/deserializer (SERDES) lanes. Each of the SERDES lanes is operable at a 50/N Gb/s rate, where N is the number of the one or more SERDES lanes.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

FIG. 1 is a block diagram of a blade server system including a 50 Gb/s Ethernet controller, according to some embodiments described herein. The blade server system 100 includes various cards 110 in data communication via a midplane 120. The midplane 120 is a printed circuit board (PCB) that mounts on a blade server chassis and provides power distribution, fabric connectivity, and system management infrastructure to the blade server system 100. The midplane 120 is generally formed of multiple layers of dielectric substrates with conductive paths, referred to herein as traces, formed on one or more of the dielectric layers. Cards 110 plug into the midplane 120 by way of connectors (not shown) on both the midplane 120, and the traces on the midplane 120 provides electrical coupling therebetween. As FIG. 1 is a block diagram rather than an actual illustration, traces are represented schematically and are not meant to show physical location.

In the example blade server system 100, the cards 110 connected by the midplane 120 include one or more server blades 130 and one or more network switches 140. Through the midplane 120, the server blades 130 are connected to the network switches 140, which in turn allows the various server blades 130 to communicate with each other and with components, devices, and systems external to the blade server system 100. The blade server system 100 may reside, for example, in a data center that is in communication with the Internet. In the embodiment of FIG. 1, the network switches 140 are used in a redundant configuration, with network switch 140-1 active and network switch 140-2 on standby.

A server blade 130 includes one or more host processors 150, a memory controller and I/O hub 160, and a 50 Gb/s Local Area Network (LAN) On Motherboard 170. A host processor 150 communicates data to the LAN On Motherboard (LOM) 170, which encapsulates the data into Ethernet frames and transmits the Ethernet frames over the midplane 120 to the network switch 140. In this manner, Ethernet frames are communicated from the host processor 150 to the LOM 170, to the midplane 120, to the network switch 140. From the network switch 140, the Ethernet frames may be conveyed to another network switch 140 in the blade server system 100, to another blade server system 100 in the data center, or to the Internet. In the reverse direction, the LOM 170 receives Ethernet frames from the network switch 140 over the midplane 120 and provides the data encapsulated in the Ethernet frame to the host processor 150.

More specifically, an LOM 170 includes one or more ports 180, where each port 180 connects to a specific group of traces on the midplane 120. Each of the trace groups then connects to a port 190 of a network switch 140. In this manner, each LOM port 180 is electrically coupled to one of the switch ports 190 by a group of traces. A group of traces may comprise, for example, two pairs of differential signals: a transmit positive signal; a transmit negative signal; a receive positive signal; and a receive negative signal.

The group of traces associated with a single LOM port 180 is referred to herein as a link 195. A link 195 thus represents a single communication transport path between an LOM port 180 and a switch port 190. The LOMs 170 in FIG. 1 have two ports. Thus, the first LOM 170-1 includes link 195-1-A and link 195-1-B while the second LOM 170-2 includes link 195-2-A and link 195-2-B. The embodiment of FIG. 1 includes redundancy features, whereby link 195-1-A and link 195-2-A are active while link 195-1-B and link 195-2-B are on standby. In other embodiments without redundant switches, both switches 140-1 and 140-2 are active, with all four links 195-1-A, 195-1-B, 195-2-A and 195-2B being active as well. In non-redundant embodiments, the ports 190 on both switches 140-1 and 140-2 can handle 50 Gb/s Ethernet traffic.

While represented as a single line in FIG. 1, various embodiments of the LAN On Motherboard 170 implement a link 195 as a group of serializer/deserializer (SERDES) lanes. As explained in more detail below, an LOM 170 associates lanes with links an inventive manner to achieve data rate of 50 Gb/s per port across the midplane 120.

It will be understood that the specific number of components illustrated in FIG. 1 is not limiting. Although the LOM 170 shown in FIG. 1 includes two ports, other embodiments may include more than two ports, while still other embodiments include a single port. Similarly, although the server blade 130 is shown with two host processors 150 in FIG. 1, other numbers of host processors 150 are also contemplated. Also, other types of cards 110 may be present in a blade server system 100. Having discussed the role of the LAN On Motherboard 170 in the overall blade server system 100, the data communication function of the LOM 170 will now be described in more detail.

The SERDES lane distribution techniques disclosed herein are described in the context of an Ethernet controller implemented as part of a LAN On Motherboard integrated circuit. However, the same techniques can be employed in an Ethernet network switch MAC port operating at 50 Gb/s, or more generically, can be employed in any Ethernet controller operating at 50 Gb/s. Using the SERDES lane distribution techniques disclosed herein, Ethernet controllers are thus operable to transmit and receive Ethernet frames over one or more SERDES lanes. Each of the SERDES lanes is operable at a 50/N Gb/s rate, where N is the number of the one or more SERDES lanes.[

Figure 2A:
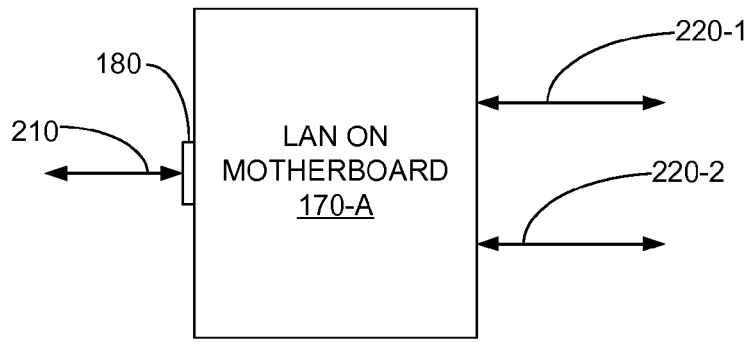
FIGS. 2A-C are block diagrams illustrating various embodiments of the LAN On Motherboard (LOM) of FIG. 1, differing in the number of lanes used per link.
Figure 2B:
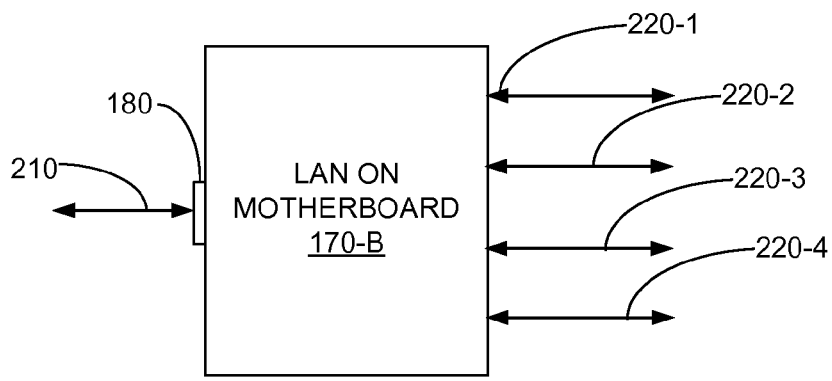
Figure 2C:
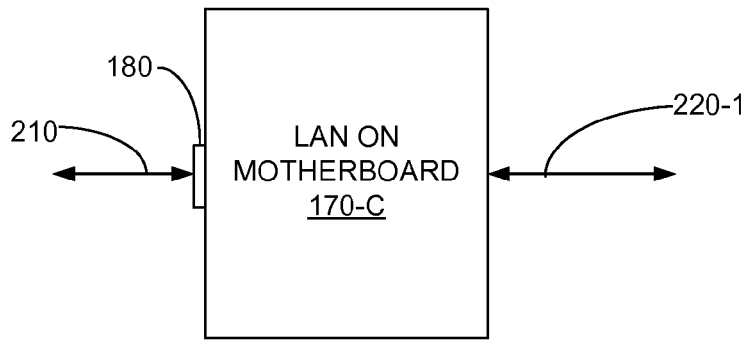

FIGS. 2A-C are block diagrams showing various configurations or embodiments of the LAN On Motherboard 170, and the number of lanes used per link for each. The LOM 170 receives data from the host processor 150 over a host data path 210 and also sends data to the host processor 150 over the host data path 210. The host data path 210 may be implemented as a bus, for example, PCI-Express. Viewed logically, the data is sent to, and received from, a particular port 180 of the LOM 170. That is, the host processor 150 sends data to, and receives data from, a particular port 180 of the LOM 170 rather than to and from the LOM 170 as a whole. Because that port 180 is associated with a Media Access Control (MAC) address, a port 180 may be referred to herein as a MAC port 180. A single MAC port 180 is shown in FIGS. 2A-C for ease of explanation, but multi-port LOMs will be discussed later.

As discussed earlier in connection with FIG. 1, the LAN On Motherboard 170 supports a 50 Gb/s link rate. This is achieved by distributing outgoing traffic among multiple serializer/deserializers (SERDES) lanes, and in the reverse direction, aggregating traffic from multiple SERDES lanes into a single LOM port 180. While particular numbers of SERDES lanes will be discussed in connection with FIGS. 2A-C, in the general case each SERDES lane operates at rate up to 50/N, where N is the number of SERDES lanes 220 implemented by the LOM 170.

In the embodiment of FIG. 2A, 50 Gb/s is achieved by communicating the Ethernet frames generated by the LOM 170-A over two lanes 220-1 and 220-2 provided by corresponding serializer/deserializers (SERDESes), where each of the SERDES lanes 220-1 and 220-2 operates at 25 Gb/s. The LOM 170 bonds the two lanes (220-1 and 220-2) together using a multi-lane distribution technique to create a single logical MAC port 180 operating at 50 Gb/s. This configuration permits blade server chasses that are midplane-resource limited to overcome the link speed limitation of Ethernet ports operating at 10 Gb/s or 20 Gb/s. In some embodiments, a 25 Gb/s SERDES lane 220 is implemented by using one of the four 25 Gb/s SERDES lanes of a 100 Gb/s physical layer transceiver (PHY), where the other lanes of the 100 Gb/s PHY may be used by another LOM 170-A, or by another MAC port of the same LOM 170-A. In such an implementation, the LOM 170-A splits the 100 Gb/s PHY into four physical and logical ports, each operating at up to 50 Gb/s.

FIG. 2B illustrates another embodiment of the LAN On Motherboard 170, one which utilizes four SERDES lanes. In this embodiment, the LOM 170 communicates the Ethernet frames generated by the LOM 170-B over lanes 220-1, 220-2, 220-3, and 220-4 provided by corresponding SERDESes, where each of the SERDES lanes 220-1, 220-2, 220-3, and 220-4 operates at 12.5 Gb/s. The LOM 170 bonds four lanes (220-1 ... 4) together using a multi-lane distribution technique to create a single logical MAC port 180 operating at 50 Gb/s. This configuration permits blade server chasses having four SERDES lanes per port to send data at a 20% faster rate than if the same four lanes were running at 10 Gb/s speed, as with a typical IEEE 40 G port. In some embodiments, a 12.5 Gb/s SERDES lane 220 is implemented by increasing the data rate of a 10 Gb/s SERDES lane by 25%.

FIG. 2C illustrates another embodiment of the LAN On Motherboard 170, one which utilizes one SERDES lane. In this embodiment, the LOM 170 communicates the Ethernet frames generated by the LOM 170-B over a single lane 220-1 provided by a single SERDES operating at 50 Gb/s. In some embodiments, a 50 Gb/s SERDES lane 220 is implemented by using one of the four 25 Gb/s SERDES lanes of a 100 Gb/s physical layer transceiver (PHY), where the other lanes of the 100 Gb/s PHY may be used by another LOM 170-A, or by another MAC port of the same LOM 170-A. In such an implementation, the LOM 170-A splits the 100 Gb/s PHY into two physical and logical ports, each operating at up to 50 Gb/s, for an economical dual-port 50 G implementation that can serve networking port redundancy needs.

In each of the embodiments of FIGS. 2A-C, the LAN On Motherboard 170 represents the 50 Gb/s interface as a MAC port 180. Some embodiments of the LOM 170 can auto-negotiate link speed through extended capabilities register(s) implemented by the MAC port 180. In some embodiments, the 50 Gb/s rate is implemented using proprietary bit locations in the link capabilities register(s). The link can also be forced to run at 50 Gb/s without advertising an auto-negotiation capability.

In some embodiments, the auto-negotiation advertising is conducted on lane 0 of the SERDES and is in accordance with IEEE 802.3an specifications. Distinction is made in the auto-negotiation bits that help the far end link partner to identify whether 50 Gb/s is being advertised for two-SERDES-lanes-mode running at 25 Gb/s each, or four-SERDES-lanes-mode running at 12.5 Gb/s each. In some embodiments, the 50 G auto-negotiation integrates into the Physical Code Sublayer (PCS) defined by IEEE 802.3 for standardized speeds (e.g., 10 G, 40 G) and leverages some of the reserved fields. This allows the LAN On Motherboard 170 to advertise 50 G capability along with other supported speeds, which permits the link to operate at any of the advertised speeds under IEEE 802.3 clause 73 auto-negotiation. A link partner that does not recognize 50 G speed indication could then choose to link at one of the other speeds that is supported.

The auto-negotiation base pages defined by 802.3an may be exchanged between the two ends of the backplane channel, with the exchange taking place on physical lane 0. After the exchange of the base page, the link partners may exchange an Organization Unique Identifier (OUI) tagged formatted Next Page (using message code #5) and then an OUI tagged unformatted Next Page with an extended technology abilities field, as detailed below. The link operating speed is determined by the highest common denominator advertised by the link partners, and resolved according to the priority table shown below as Table 1:

TABLE 1

| Priority | Technology | Capability |
| --- | --- | --- |
| 1 | 100GBASE-CR10 | 100 Gb/s, 10 lane |
| 2 | 50GBASE-CR1 | 50 Gb/s, 1 lane, copper cable |
| 3 | 50GBASE-KR1 | 50 Gb/s, 1 lane, backplane traces |
| 4 | 50GBASE-CR2 | 50 Gb/s, 2 lanes, copper cable |
| 5 | 50GBASE-KR2 | 50 Gb/s, 2 lanes, backplane traces |
| 6 | 50GBASE-CR4 | 50 Gb/s, 4 lanes, copper cable |
| 7 | 50GBASE-KR4 | 50 Gb/s, 4 lanes, backplane traces |
| 8 | 40GBASE-CR4 | 40 Gb/s, 4 lanes, copper cable |
| 9 | 40GBASE-KCR4 | 40 Gb/s, 4 lanes, backplane traces |
| 10 | 20GBASE-CR2 | 20 Gb/s, 2 lanes, copper cable |
| 11 | 20G-MLD2 | 20 Gb/s, 2 lanes, backplane traces |
| 12 | 10GBASE-KR2 | 10 Gb/s, 1 lane, backplane traces |
| 13 | 10GBASE-KX4 | 10 Gb/s, 4 lanes, backplane traces |
| 14 | 10GBASE-KX | 1 Gb/s, 1 lane, backplane traces |

FIG. 3 illustrates an OUI tagged formatted Next Page used during auto-negotiation, according to some embodiments of LAN On Motherboard 170. Next Page 300 includes an OUI field 310 and a message code field 320. In this example, the value in the OUI field 310 is a vendor-specific value of 000AF7(h) and the value in the message code field 320 is 5.

FIG. 4 illustrates another OUI tagged formatted Next Page used during auto-negotiation, according to some embodiments of LAN On Motherboard 170. Next Page 400 includes an OUI field 410, a message code field 420, and an extended technologies field 430. In this example, the value in the OUI field 410 is a vendor-specific value of 000AF7(h), the value in the message code field 420 is 3 to indicate that the page describes extended technology abilities, and the value in the extended technology capabilities field is set to indicate 50 Gb/s operation.

In addition to the SERDES lane bonding described above, a MAC port 180 on the LAN On Motherboard 170 can be bonded with 50 Gb/s ports or other speed ports for all Ethernet traffic using any of the commonly used bonding protocols used to team Ethernet ports (e.g., IEEE 802.1AX Link Aggregation).

Figure 5:
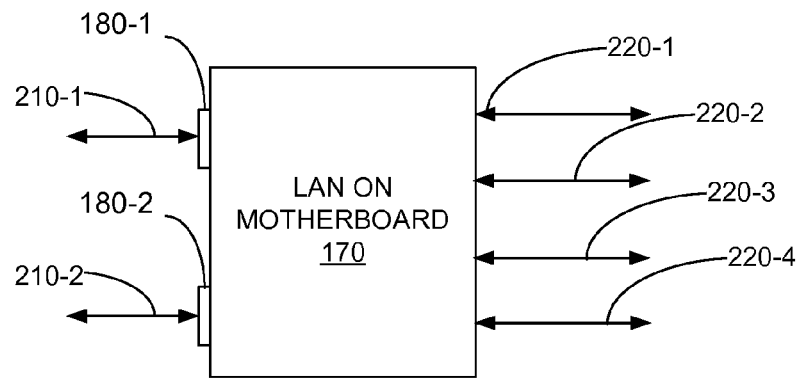
FIG. 5 is a block diagram illustrating a dual-port embodiment of the LAN On Motherboard (LOM) of FIG. 1.

FIG. 5 is a block diagram illustrating a dual-port embodiment of the LAN On Motherboard 170 of FIG. 1. While the embodiments discussed in connection with FIGS. 2A-C provided one MAC port 180, the embodiment of FIG. 3 includes two MAC ports 180-1 and 180-2. Each of the MAC ports 180-1 and 180-2 is associated with a corresponding host data path 210-1 and 210-2. MAC port 180-1 is associated with SERDES lanes 220-1 and 220-2, each operating at 25 Gb/s. MAC port 180-2 is associated with SERDES lanes 220-3 and 220-4, each operating at 25 Gb/s. That is, data from host data path 210-1 becomes Ethernet frames which are transmitted on SERDES lanes 220-1 and 220-2 while data from host data path 210-2 becomes Ethernet frames which are transmitted on SERDES lanes 220-3 and 220-4. In the reverse direction, Ethernet frames received on SERDES lanes 220-1 and 220-2 are provided to the host processor 150 over host data path 210-1 while Ethernet frames received on SERDES lanes 220-3 and 220-4 are provided to the host processor 150 over host data path 210-2. In some embodiments, the SERDES lanes 220-1 ... 4 are implemented by using the four 25 Gb/s SERDES lanes of a 100 Gb/s physical layer transceiver (PHY). Having described the overall functionality of the LOM 170 according to various embodiments, various structures associated with the functionality will now be discussed in more detail.

Figure 6:
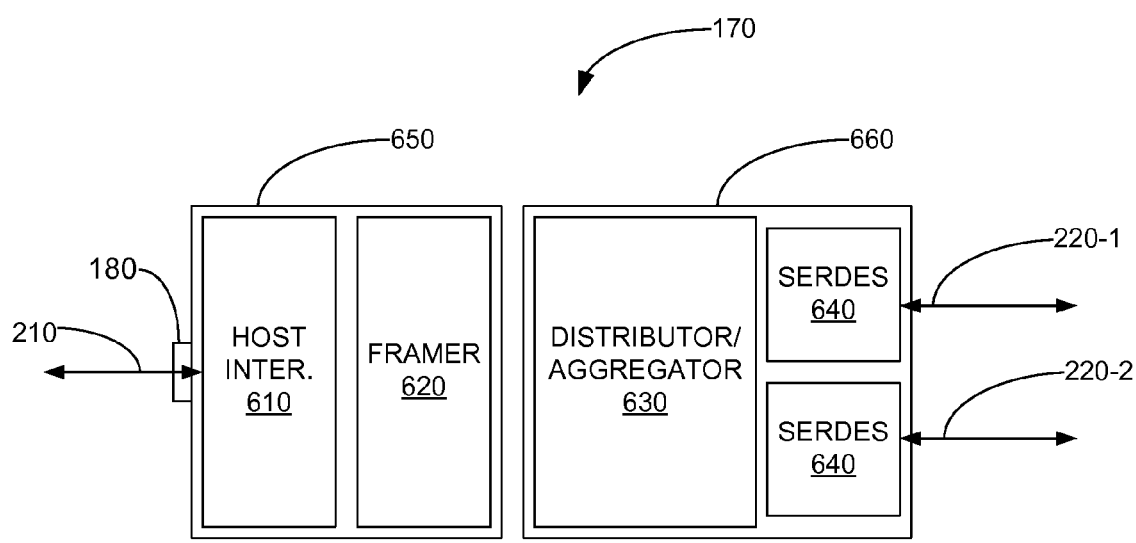
FIG. 6 is a block diagram illustrating some of the functional blocks within the LAN On Motherboard (LOM) of FIG. 1.

FIG. 6 is a diagram illustrating various functional blocks within the LAN On Motherboard 170 of FIG. 1, according to some embodiments disclosed herein. In the embodiment of FIG. 4, the LAN On Motherboard 170 includes a host interface 610, a framer 620, a distributor/aggregator 630, and one or more SERDESes 640. The LAN On Motherboard 170 may also include various other functional blocks not shown in FIG. 6 such as (but not limited to) a management bus interface, a management processor, a bus arbiter, a direct memory access (DMA) engine, auto-negotiation logic, various buffers and memories, and one or more processors.

As explained above, data is conveyed between the LOM 170 and the host processor 150 over the host data path 210. More specifically, the host processor 150 communicates with a host interface 610 implemented by the LOM 170. To this end, the host interface 610 may include various configuration registers, data registers, mailboxes, shared memory locations, interrupts, and combinations thereof. As noted above, the host processor 150 communicates with a particular MAC port 180. Therefore, a MAC port 180 may be implemented as a particular subset of these host interface resources.

A framer 620 encapsulates data from the host processor 150 into Ethernet frames, and de-encapsulates data from Ethernet frames received over the midplane 120. Functions implemented by the framer 620 may include, but are not limited to: preamble generation and detection; insertion and/or removal of source and destination MAC addresses; and Frame Check Sequence (FCS) generation, insertion, and removal.

A distributor/aggregator 630 distributes the Ethernet frames generated by the framer 620 to the appropriate one of the SERDESes 640. In the reverse direction, the distributor/aggregator 630 collects Ethernet frames received over the midplane 120 and aggregates them into one stream for processing by the framer 620. Each of the SERDESes 640 is associated with a SERDES lane 220. The embodiment shown in FIG. 6 uses two SERDES lanes 220, each operating at 25 Gb/s, to achieve a 50 Gb/s link rate. In some embodiments, the host interface 610 and the framer 620 are grouped together as MAC circuitry while the distributor/aggregator 630 and the SERDESes 640 are grouped together as physical layer (PHY) circuitry. In some embodiments, the distributor/aggregator 630 resides in Physical Coding Sublayer (PCS) circuitry 650 and the SERDESes 640 reside in Physical Medium Attachment sublayer (PMA) circuitry 660.

Having introduced the distributor/aggregator 630, frame distribution among lanes performed by the LOM 170 will now be described in further detail. The IEEE 802.3 standard for 40 Gb/s and 100 Gb/s Ethernet employs multi-lane distribution (MLD) to distribute data from a single MAC port across a number of virtual lanes. For a given operating speed, the number of virtual lanes, also referred to as Physical Coding Sublayer (PCS) lanes, is determined by the least common multiple (LCM) of the desired range of Physical Medium Dependent (PMD) lanes. In the case of 100 Gb/s, the desired range of PMD lanes is 1, 2, 4, 5, and 10, which yields an LCM of 20. Thus, the IEEE 802.3 standard for 100 Gb/s Ethernet uses MLD striped across 20 virtual lanes. This is sometimes referred to as MLD20. In the case of 40 Gb/s, the desired range of PMD lanes is 1, 2 and 4, which yields an LCM of 4. Thus, the IEEE 802.3 standard for 40 Gb/s Ethernet uses MLD striped across 4 virtual lanes, and sometimes referred to as MLD4.

The MLD striping technique described in the IEEE standard for 100 Gb/s and 40 Gb/s uses a unique alignment marker (AM) for each virtual lane. The AMs are inserted into the striped data stream every 16,000 codewords, where every codeword employs 64b/66b encoding. The use of a unique AM for each lane supports three different functions of the MLD striping technique: lane identification; lane alignment; and bit-level multiplexing/demultiplexing. In the case of 100 Gb/s using MLD20, there are 20 unique AMs, one for each virtual lane. In the case of 40 Gb/s using MLD4, there are 4 unique AMs. In some embodiments of the LAN On Motherboard 170, the virtual lane alignment markers are identical to the ones used for PCS lane 0, 1, 2, and 3 of the IEEE 802.3 standard for 40 GBASE-R.

Figure 7A:
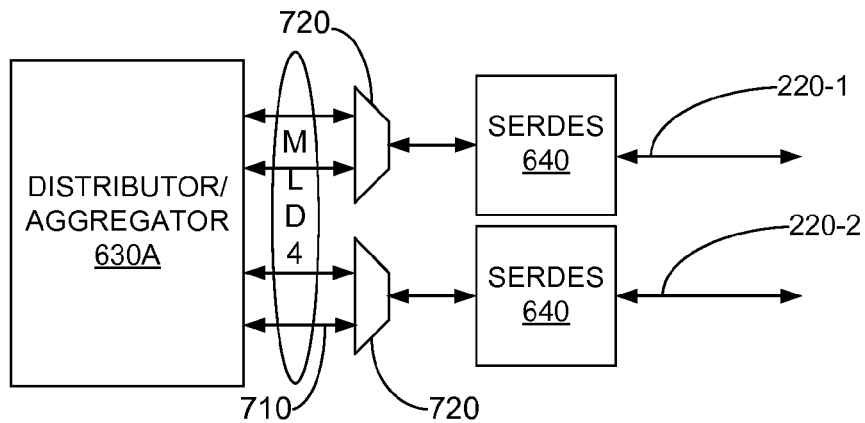
FIGS. 7A-C are block diagrams illustrating various embodiments of the LAN On Motherboard (LOM) of FIG. 1, showing striping across various numbers of Physical Coding Sublayer (PCS) lanes.

FIG. 7A illustrates another embodiment of the LAN On Motherboard 170, one which utilizes two SERDES lanes. In this embodiment, the distributor/aggregator 430A uses MLD4 to stripe across four PCS lanes 710. Since the number of PCS lanes is greater than the number of SERDES lanes, multiplexers/demultiplexers are used. More specifically, a 2:1 bit-level multiplexer/demultiplexer circuit 720 is located in front of each of two 25.78 Gb/s backplane SERDESes 640. The two SERDESes 440 then communicate the two SERDES lanes 220 across a backplane link 195 (FIG. 1).

Figure 7B:
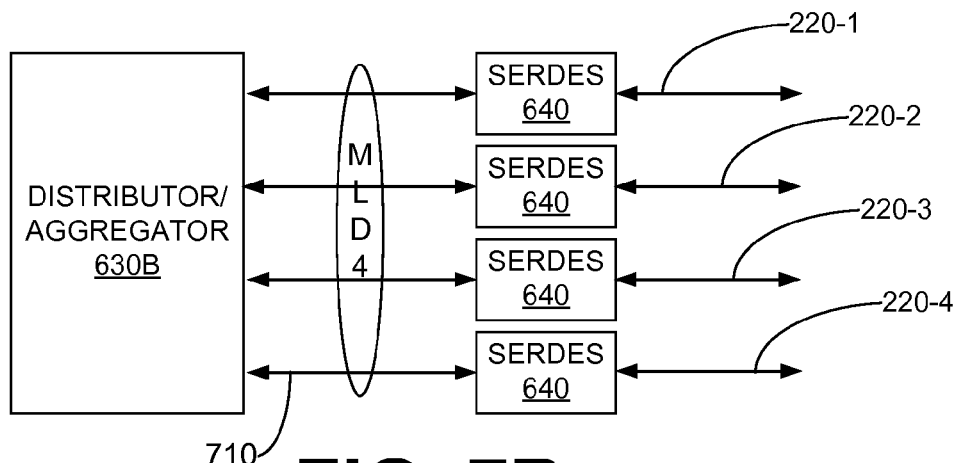

FIG. 7B illustrates yet another embodiment of the LAN On Motherboard 170, one which utilizes four SERDES lanes. In this embodiment, the distributor/aggregator 630B uses MLD4 to stripe across four PCS lanes 710. Since the number of PCS lanes is the same as the number of SERDES lanes, no multiplexer/demultiplexer is used, and the four SERDESes 440 communicate the four SERDES lanes 220 across a backplane link 195 (FIG. 1).

Figure 7C:
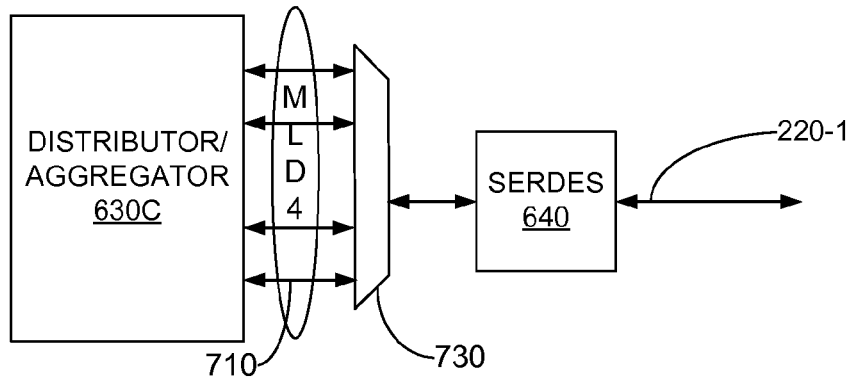

FIG. 7C illustrates still another embodiment of the LAN On Motherboard 170, one which utilizes one SERDES lane. In this embodiment, the distributor/aggregator 430C uses MLD4 to stripe across four PCS lanes 710. Since the number of PCS lanes is greater than the number of SERDES lanes, a multiplexer/demultiplexer is used. More specifically, a 4:1 bit-level multiplexer/demultiplexer circuit 730 is located in front of a single 50 Gb/s backplane SERDES 440, and the SERDES 440 communicates the four SERDES lanes 220 across a backplane link 195 (FIG. 1). Bit-level multiplexers having sizes other than 4:1 and 2:1 can be utilized in a similar manner.

Figure 8:
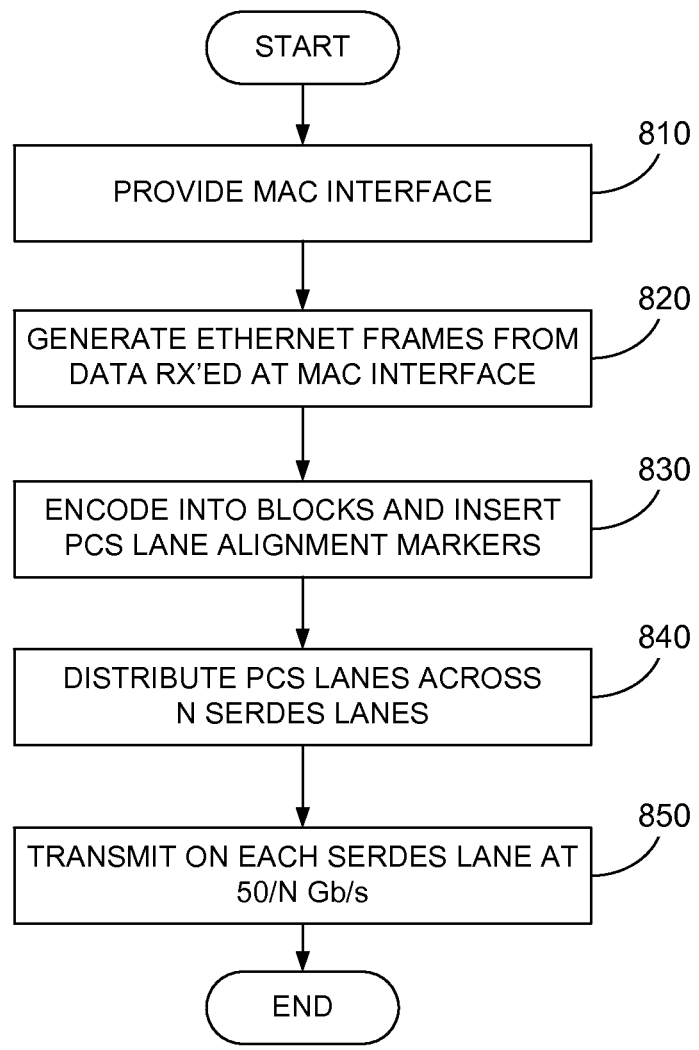
FIG. 8 is a flowchart illustrating transmit operation of the LAN On Motherboard (LOM) of FIG. 1, according to some embodiments disclosed herein.

FIG. 8 is a flowchart illustrating transmit operations of the LAN On Motherboard 170, according to some embodiments disclosed herein. Alternatively, the flowchart of FIG. 8 may be viewed as implementing various steps of a method for conveying Ethernet frames across a midplane, as performed by the LAN On Motherboard 170. At block 810, a media access control (MAC) interface is provided. The MAC interface is associated with a port 180 having a 50 Gb/s link rate. Next, at block 820, Ethernet frames are generated from data received at the MAC interface. At block 830, the stream of Ethernet frames is encoded into blocks and PCS lane alignment markers are periodically added to allow the receive side to deskew the lanes. At block 840, the PCS lanes are distributed across N SERDES lanes. In some embodiments, M=4 and the distribution uses the MLD4 striping technique from IEEE 802.3. Next, at block 850, the distributed Ethernet frames are transmitted on each of the SERDES lanes at a 50/N Gb/s rate.

Figure 9:
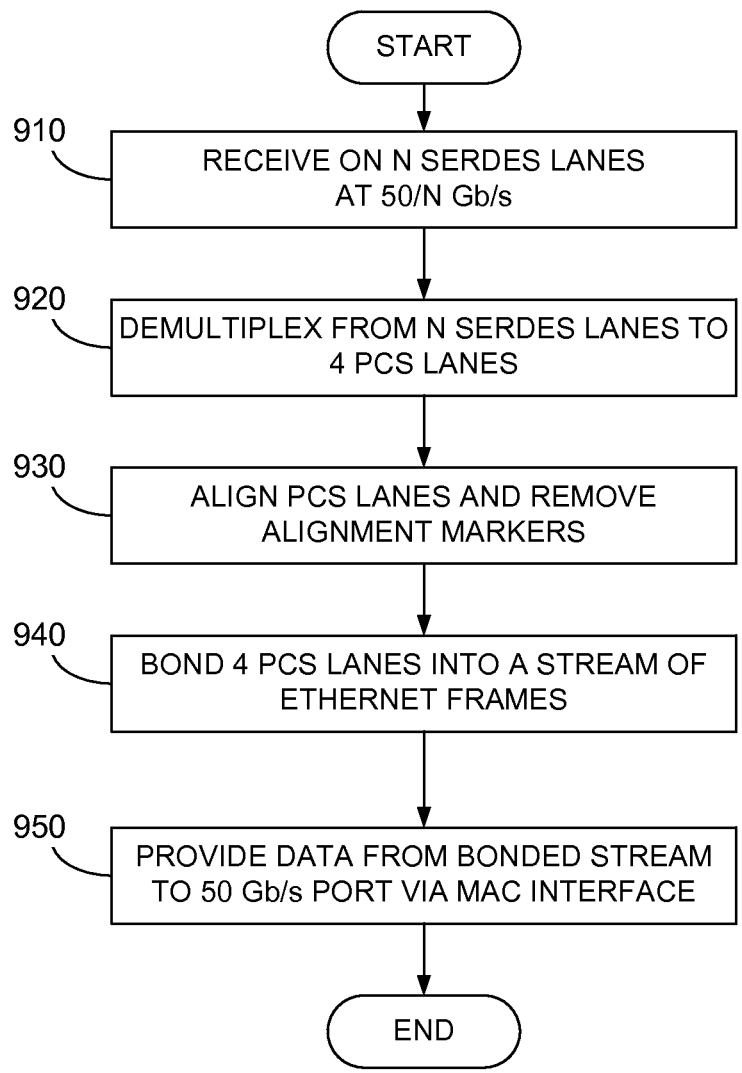
FIG. 9 is a flowchart illustrating receive operation of the LAN On Motherboard (LOM) of FIG. 1, according to some embodiments disclosed herein.

FIG. 9 is a flowchart illustrating receive operations of the LAN On Motherboard 170, according to some embodiments disclosed herein. Alternatively, the flowchart of FIG. 9 may be viewed as implementing various steps of a method for conveying Ethernet frames across a midplane, as performed by the LAN On Motherboard 170. At block 910, a media access control (MAC) interface is provided. The MAC interface is associated with a port 180 having a 50 Gb/s link rate. At block 910, Ethernet frames are received on each of N SERDES lanes 220, associated with the port 180, at a rate of 50/N Gb/s. At block 920, Ethernet frames are demultiplexed from N SERDES to M PCS lanes. In some embodiments, M=4 and the MLD4 striping technique from IEEE 802.3 is used. At block 930, the M PCS lanes are aligned using alignment markers within the blocks that encode the received Ethernet frames. Once alignment is performed, the alignment markers are removed. At block 940, the aligned frames are bonded or aggregated into a single stream of Ethernet frames. Next, at block 950, the data from the bonded stream of Ethernet frames is provided to a 50 Gb/s port of a MAC interface.

The LAN On Motherboard 170 and other various components described herein may be embodied in dedicated hardware, software executing on general-purpose hardware, software executing on special-purpose hardware, or a combination thereof. If embodied in dedicated hardware, the LOM 170 can be implemented as circuitry and/or a state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals. Such technologies are generally well known by those skilled in the art and, consequently, are not described, in detail herein.

When implemented as software, i.e., instructions executing on a processor, any logic described herein (including the LOM 170) that comprises software or code can be embodied in any non-transitory computer-readable medium for use by or in connection with a processor. In this sense, the logic may comprise, for example, statements including instructions and declarations that can be fetched from the computer-readable medium and executed by a processor. In the context of the present disclosure, a "computer-readable medium" can be any medium that can contain, store, or maintain the logic or application described herein for use by or in connection with the processor. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The diagrams of FIGS. 8 and 9 show the functionality and operation of an implementation of portions of the LOM 170. If embodied in software, each block may represent a module, segment, or portion of code that comprises program instructions to implement the specified logical function(s). The program instructions may be embodied in the form of source code that comprises human-readable statements written in a programming language or machine code that comprises instructions recognizable by a processor. The machine code may be converted from the source code, etc. If embodied in hardware, each block may represent a functional block of specialized hardware, a circuit, or a number of interconnected circuits to implement the specified logical function(s).

Although the diagrams of FIGS. 8 and 9 show a specific order of execution, it is understood that the order of execution may differ from that which is depicted. For example, the order of execution of two or more blocks may be scrambled relative to the order shown. Also, two or more blocks shown in succession in the diagrams of FIGS. 8 and 9 may occur concurrently or with partial concurrence. Further, in some embodiments, one or more of the blocks shown in the diagram of FIGS. 8 and 9 may be skipped or omitted. In addition, any number of counters, state variables, semaphores, or messages might be added to the logical flow described herein, for purposes of enhanced utility, accounting, performance measurement, or providing troubleshooting aids, etc. It is understood that all such variations are within the scope of the present disclosure. It is understood that the diagrams of FIGS. 8 and 9 merely provide an example of the many different types of functional arrangements that may be employed to implement the operation of portion(s) of the LOM 170 as described herein. As an alternative, the diagrams of FIGS. 8 and 9 may be viewed as depicting an example of steps of a method implemented in the LOM 170 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A device comprising:
   circuitry operable to provide a media access control (MAC) interface associated with a port having a 50 Gb/s link rate;
   circuitry operable to generate Ethernet frames from data received at the MAC interface;
   circuitry operable to distribute the Ethernet frames across a group of one or more serializer/deserializer (SERDES) lanes associated with the port, the group having a size N, wherein the SERDES lanes are arranged to electrically couple to a corresponding plurality of SERDES lanes on a midplane of a blade server chassis; and
   circuitry operable to transmit the distributed Ethernet frames on each of the SERDES lanes at a 50/N Gb/s rate.

2. The device of claim 1, further comprising MAC circuitry and physical layer (PHY) circuitry, wherein the MAC circuitry includes the circuitry operable to provide the MAC interface and the circuitry operable to generate the Ethernet frames, and wherein the PHY circuitry includes the circuitry operable to distribute the Ethernet frames and the circuitry operable to transmit the distributed Ethernet frames.

3. The device of claim 2, wherein N is 1, 2 or 4.

4. The device of claim 1, further comprising:
   circuitry operable to receive Ethernet frames on each of the SERDES lanes at a 50/N Gb/s rate;
   circuitry operable to bond the SERDES lanes into a stream of received Ethernet frames; and circuitry operable to provide data from the bonded stream of Ethernet frames to the MAC port at a 50 Gb/s rate.

5. The device of claim 1, wherein N is 1, 2 or 4.

6. The device of claim 1, wherein each of the SERDES lanes on the midplane is associated with an electrical trace group on the midplane.

7. The device of claim 6, wherein each of electrical trace groups includes a transmit differential pair and a receive differential pair.

8. The device of claim 1, wherein the circuitry operable to distribute is further operable to distribute the Ethernet frames across the N SERDES lanes using Multi-Lane Distribution across M Physical Coding Sublayer (PCS) lanes.

9. The device of claim 1, wherein the device is further operable to support another link rate lower than 50 Gb/s and to autonegotiate between the link rates.

10. The device of claim 9, wherein the autonegotiation is conducted on a lane 0 of the SERDES lanes.

11. The device of claim 9, wherein the autonegotiation is conducted in accordance with IEEE 802.3an.

12. A device comprising:
network interface controller (NIC) circuitry operable to provide a Media Access Control (MAC) associated with a 50 Gb/s port and to generate Ethernet frames from data received at the MAC interface;
serializer/deserializer (SERDES) circuitry operable to implement a group of one or more SERDES lanes associated with the 50 Gb/s port, the group having a size N, wherein the one or more SERDES lanes are arranged to electrically couple to corresponding SERDES lanes on a midplane of a blade server chassis; and a physical layer transceiver (PHY) operable to distribute the Ethernet frames across the one or more SERDES lanes, wherein
the SERDES circuitry is further operable to transmit distributed Ethernet frames on each of the SERDES lanes at a 50/N Gb/s rate.

13. The device of claim 12, wherein the SERDES circuitry resides in the PHY.

14. The device of claim 12, wherein N is 1, 2 or 4.

15. The device of claim 12, wherein first SERDES lanes of the one or more SERDES lanes are arranged to electrically couple to a corresponding first plurality of SERDES lanes on a midplane of a blade server chassis and second SERDES lanes of the one or more SERDES lanes are arranged to electrically couple to a corresponding second plurality of SERDES lanes on the midplane.

16. The device of claim 12, wherein each of the SERDES lanes on the midplane are associated with an electrical trace group on the midplane.

17. The device of claim 12, wherein N=2 and the PHY transceiver is further operable to distribute the Ethernet frames over 4 virtual lanes, the device further comprising a 2:1 bit level multiplexer operable to multiplex the 4 virtual lanes across the 2 SERDES lanes.

18. The device of claim 12, wherein N=1 and the PHY transceiver is further operable to distribute the Ethernet frames over 4 virtual lanes, the device further comprising a 4:1 bit level multiplexer operable to multiplex the 4 virtual lanes across the 1 SERDES lane.

* * * * *